Patented Nov. 30, 1937

2,100,370

UNITED STATES PATENT OFFICE 2,100,370

VULCANIZATION OF RUBBER

Ira Williams, Woodstown, N. J., assignor to E. I. du Pont de Nemours & Company, Wilmington, Del., a corporation of Delaware No Drawing. Application May 18, 1935, Serial No. 22,171

12 Claims. (Cl. 18—53)

This invention relates to the vulcanization of rubber and more particularly to the control of the activity of accelerators employed in the vulcanization.

It has been recognized that certain types of accelerators of vulcanization become much more active in the presence of various chemical activating agents. In general, it is known that accelerators which contain sulfur and which are acidic or which will hydrolyze to produce salts of thio acids or mercaptans will become more effective in the presence of basic materials such as ammonia or diphenyl guanidine. The increase in activity, when produced in this manner, takes place at low temperature as well as at the usual vulcanizing temperatures so that compounds accelerated with the combination of acidic sulfur containing accelerators and basic organic materials become very troublesome due to vulcanization during processing or during storage previous to being processed.

Numerous materials have been proposed for controlling the activity of accelerators and the effectiveness of acids such as benzoic, phthalic, and salicylic is generally known. Such products as diphenyl guanidine acid phthalate and other half salts of dibasic organic acids which still contain free carboxyl groups have also been proposed as combined activators and retarders.

It is an object of the present invention to provide a class of compounds as activators for acidic type sulfur containing accelerators. A further object is to provide a class of compounds which will more effectively retard vulcanization by acidic sulfur containing accelerators at low temperatures but which will activate such accelerators at the higher or usual vulcanization temperatures. A still further object is to provide a method for controlling the vulcanization of rubber. Other objects are to provide new compositions of matter and to advance the art. Still other objects will appear hereinafter.

These objects may be accomplished in accordance with my invention which comprises incorporating in rubber prior to vulcanization an acidic type sulfur containing accelerator and, as a vulcanization controlling agent, a salt of an inorganic acid and an aromatic amine. By the term "an acidic type sulfur containing accelerator", I mean those containing the groups

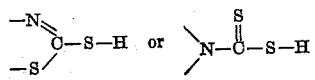

of which the mercapto arylene thiazoles, the disubstituted di-thiocarbamates and derivatives of these which result from replacement of the hydrogen of the mercapto group of the corresponding thiazole or di-thiocarbamic acid are illustrative.

By the term "salt of an inorganic acid and an aromatic amine", I mean those salts which are formed by the reaction of an inorganic acid on a primary, secondary or tertiary amine. While there is some difference in opinion, as to whether or not diaryl guanidines are amines, they are so considered by me in the present case and are to be understood to fall within the term "aromatic amine" as employed by me in this case. Of the various aromatic amines, the primary amines will generally be preferred. Among these, those whose salts have proved to be the most satisfactory are aniline, o-toluidine, alpha-naphthylamine and di-phenyl guanidine. Also, the salts may be either the neutral or acid salts but the neutral salts will generally be preferred. In the following examples, the compounds will be the neutral salts except where otherwise indicated.

Among the inorganic acids which have proved to be particularly satisfactory there may be mentioned hydrochloric acid, sulfuric acid and orthophosphoric acid. Chloracetic acid is a strong acid closely approaching the inorganic acids in strength and properties. Its salts closely approach the salts of the inorganic acids in properties and efficiency and may be considered to be substantial equivalents of the inorganic acid salts.

In order to more clearly illustrate my invention, the preferred modes of carrying the same into effect and the advantageous results to be obtained thereby, the following examples are given:

Example 1

A base compound was milled which consisted of 100 parts of rubber, 25 parts of carbon black, 5 parts of zinc oxide, 3 parts of sulfur, 3 parts of stearic acid and 0.5 part of mercapto benzothiazole. To this compound was added 0.5 part of the activator to be tested. The results of physical tests, after being vulcanized at both 227° F. and 287° F., are shown in Table 1.

Table 1

| Material | Min. cure | Cured at 227° F. | | Cured at 287° F. | |
|---|---|---|---|---|---|
| | | Lbs./in.² at 500% elong. | Lbs./in.² at break | Lbs./in.² at 500% elong. | Lbs./in.² at break |
| a-Naphthylamine hydrochloride | 30 | | 25 | 1650 | 3325 |
| | 60 | 25 | 175 | 2025 | 3525 |
| o-Toluidine sulfate | 30 | | 50 | 1750 | 3725 |
| | 60 | 100 | 350 | 2250 | 3550 |
| Aniline sulfate | 30 | 75 | 150 | 2050 | 4050 |
| | 60 | 275 | 600 | 2400 | 3950 |
| Mono aniline orthophosphate | 30 | 50 | 150 | 1550 | 3550 |
| | 60 | 150 | 525 | 2200 | 3850 |
| o-Toluidine chloracetate | 30 | | | 1375 | 3000 |
| | 60 | 25 | 100 | 2025 | 3025 |
| Diphenyl guanidine sulfate | 30 | | | 2625 | 4325 |
| | 60 | 275 | 675 | 2775 | 3675 |
| Diphenyl guanidine chlor-acetate | 30 | | 25 | 2275 | 4325 |
| | 60 | 350 | 925 | 2300 | 3375 |
| Diphenyl guanidine acetate | 30 | 25 | 150 | 2875 | 4200 |
| | 60 | 1125 | 2450 | 2775 | 3700 |
| Dibutylamine hydrochloride | 30 | 650 | 1375 | 3025 | 3925 |
| | 60 | 1775 | 4100 | 2875 | 3700 |
| Piperidine hydrochloride | 30 | 1075 | 2375 | 3100 | 4100 |
| | 60 | 2075 | 4650 | 2900 | 3700 |

It will be noted that the last three compounds which fall without the scope of my invention do not have the desirable properties of the other compounds.

Example 2

A base compound was milled which consisted of 100 parts of rubber, 25 parts of carbon black, 5 parts of zinc oxide, 3 parts of sulfur, 3 parts of stearic acid and 0.5 part of a-naphthylamine hydrochloride. To this compound 0.5 part of various mercaptothiazoles were added and the compounds were vulcanized at 227° F. and 287° F. The data are shown in Table 2.

Table 2

| Material | Minutes vulcanized | Cured at 227° F. | | Cured at 287° F. | |
|---|---|---|---|---|---|
| | | Lbs./in.² at 500% elong. | Lbs./in.² at break | Lbs./in.² at 500% elong. | Lbs./in.² at break |
| 1 - mercapto - b - naphthothiazole | 30 | Not cured | | 1200 | 1550 |
| | 60 | Not cured | | 1525 | 1700 |
| 1 - mercapto - 3 - methyl benzo-thiazole | 30 | Not cured | | 1725 | 2925 |
| | 60 | 150 | 150 | 1775 | 2050 |
| 1 - mercapto - a - naphthothiazole | 30 | Not cured | | 1400 | 1750 |
| | 60 | | 150 | 1730 | 2175 |
| 1 - mercapto - 5 - methyl benzo-thiazole | 30 | Not cured | | 2000 | 2875 |
| | 60 | 175 | 350 | 2125 | 2650 |

Example 3

A base compound was milled which consisted of 100 parts of rubber, 25 parts of carbon black, 5 parts of zinc oxide, 3 parts of sulfur, 3 parts of stearic acid and 0.5 part of diphenyl guanidine sulfate, $(C_{13}H_{13}N_3)_2H_2SO_4$. This was accelerated with 0.5 part of benzothiazyl disulfide, with 0.5 part of benzothiazyl furoyl sulfide prepared by treating the sodium salt of mercapto benzothiazole with furoyl chloride and with 0.5 part of the cadmium salt of mercapto benzothiazole. The results are shown in Table 3.

Table 3

| Material | Minutes vulcanized | Cured at 227° F. | | Cured at 287° F. | |
|---|---|---|---|---|---|
| | | Lbs./in.² at 500% elong. | Lbs./in.² at break | Lbs./in.² at 500% elong. | Lbs./in.² at break |
| Benzothiazyl-disulfide | 30 | Not cured | | 2600 | 3800 |
| | 60 | 150 | 300 | 2475 | 3650 |
| Benzothiazyl furoyl sulfide | 30 | Not cured | | 2550 | 3425 |
| | 60 | 325 | 550 | 2425 | 3350 |
| Cadmium salt of mercaptobenzo thiazole | 30 | Not cured | | 2000 | 3850 |
| | 60 | 475 | 700 | 2500 | 3675 |

Example 4

A base compound was milled which contained 100 parts of rubber, 25 parts of carbon black, 5 parts of zinc oxide, 3 parts of sulfur, 3 parts of stearic acid and 0.5 part of the cadmium salt of mercapto benzothiazole. This compound was activated with 0.5 part of aniline sulfate and with 0.5 part of diphenyl guanidine sulfate. The results are shown in Table 4.

Table 4

| Material | Minutes vulcanized | Cured at 227° F. | | Cured at 287° F. | |
|---|---|---|---|---|---|
| | | Lbs./in.² at 500% elong. | Lbs./in.² at break | Lbs./in.² at 500% elong. | Lbs./in.² at break |
| Aniline sulfate | 30 | Not cured | | 1525 | 3150 |
| | 60 | 25 | 100 | 1875 | 3450 |
| Diphenyl guanidine sulfate | 30 | Not cured | | 2175 | 3825 |
| | 60 | 325 | 575 | 2300 | 3600 |

Example 5

A compound composed of 100 parts of rubber, 5 parts of zinc oxide, 25 parts of carbon black, 3 parts of sulfur, 3 parts of stearic acid and 0.5 part of the barium salt of mercapto benzothiazole was treated with aniline sulfate and with diphenyl guanidine sulfate. The results of vulcanization tests are shown in Table 5.

Table 5

| Material | Minutes vulcanized | Cured at 227° F. | | Cured at 287° F. | |
|---|---|---|---|---|---|
| | | Lbs./in.² at 500% elong. | Lbs./in.² at break | Lbs./in.² at 500% elong. | Lbs./in.² at break |
| Aniline sulfate | 30 | Not vulcanized | Not vulcanized | 1525 | 3150 |
| | 60 | Not vulcanized | Not vulcanized | 1875 | 3450 |
| Diphenyl guanidine sulfate | 30 | 15 | 125 | 2175 | 3825 |
| | 60 | 325 | 875 | 2300 | 3600 |

Example 6

A compound containing 100 parts of rubber, 5 parts of zinc oxide, 25 parts of carbon black, 3 parts of sulfur, 3 parts of stearic acid and 0.5 part of aniline sulfate was treated with 0.2 part of tetramethylthiuram monosulfide and with 0.2 part of tetramethyl thiuram disulfide. The results of physical tests are shown in Table 6.

Table 6

| Material | Minutes vulcanized | Cured at 227° F. | | Cured at 287° F. | |
|---|---|---|---|---|---|
| | | Lbs./in.² at 500% elong. | Lbs./in.² at break | Lbs./in.² at 500% elong. | Lbs./in.² at break |
| Tetramethyl thiuram monosulfide | 30 | No cure | | 1875 | 2675 |
| | 60 | 1950 | 4300 | 1750 | 1900 |
| Tetramethyl thiuram disulfide | 30 | 850 | 2075 | 1750 | 2550 |
| | 60 | 2525 | 4875 | 1625 | 1875 |

Example 7

A compound containing 100 parts of rubber, 5 parts of zinc oxide, 25 parts of carbon black, 3 parts of sulfur, 3 parts of stearic acid, 0.5 part of cadmium diethyl dithio carbamate and 0.5 part of pyridine hydrochloride was vulcanized with the results shown in Table 7.

Table 7

| Minutes vulcanized | Cured at 227° F. | | Cured at 287° F. | |
|---|---|---|---|---|
| | Lbs./in.² at 500% elong. | Lbs./in.² at break | Lbs./in.² at 500% elong. | Lbs./in.² at break |
| 30 | 1275 | 2650 | 2825 | 3600 |
| 60 | 3025 | 4850 | 2650 | 3100 |

From these various examples, it will be apparent that the compounds of my invention are much more effective than the salts of other bases and than the salts of organic acids in producing the so called "trigger action" effect. That is, with the use of these compounds of my invention there is less danger of scorching or prevulcanization during processing than with other somewhat similar compounds.

Inorganic salts of other primary, secondary and tertiary aromatic amines may be employed such as the xylidines, naphthylamines, biphenylamines, anthracylamines; arylene diamines such as phenylene diamine, toluylene diamines, naphthylene diamines, benzidines; diaryl and triaryl amines of the benzene, naphthalene, biphenyl, anthracene and like series; mono and dialkyl aryl amines; and aryl guanidines, particularly the diarylguanidines such as diorthotolyl guanidine and the like. Also, the aryl groups may contain one or more alkyl groups such as methyl, ethyl, propyl, butyl, octyl and the like.

While the above examples illustrate some of the compounds which may be employed and some of the variations and modifications which may be made therein, it will be apparent to those skilled in the art that many other changes and variations may be made without departing from the spirit of my invention. Accordingly, the scope of my invention is to be limited solely by the appended claims construed as broadly as is permissible in view of the prior art.

I claim:
1. The method of vulcanizing rubber which comprises incorporating in a rubber mix an acidic type sulfur containing accelerator and diphenyl guanidine sulfate.

2. The method of vulcanizing rubber which comprises incorporating in a rubber mix a 1-mercapto-arylene-thiazole accelerator and diphenyl guanidine sulfate.

3. Rubber having incorporated therein an acidic type sulfur containing accelerator and diphenyl guanidine sulfate.

4. Rubber having incorporated therein a 1-mercapto-arylene-thiazole accelerator and diphenyl guanidine sulfate.

5. The method of vulcanizing rubber which comprises incorporating in a rubber mix an acidic type sulfur containing accelerator and a diaryl guanidine sulfate.

6. The method of vulcanizing rubber which comprises incorporating in a rubber mix a 1-mercapto-arylene-thiazole accelerator and a diaryl guanidine sulfate.

7. Rubber having incorporated therein an acidic type sulfur containing accelerator and a diaryl guanidine sulfate.

8. Rubber having incorporated therein a 1-mercapto-arylene-thiazole accelerator and a diaryl guanidine sulfate.

9. The method of vulcanizing rubber which comprises incorporating in a rubber mix 1-mercapto-benzothiazole and diphenyl guanidine sulfate.

10. The method of vulcanizing rubber which comprises incorporating in a rubber mix benzothiazyl disulfide and diphenyl guanidine sulfate.

11. Rubber having incorporated therein 1-mercapto-benzothiazole and diphenyl guanidine sulfate.

12. Rubber having incorporated therein benzothiazyl disulfide and diphenyl guanidine sulfate.

IRA WILLIAMS.